F. P. GLASSNER.
VALVE.
APPLICATION FILED JULY 18, 1911.
1,029,184.
Patented June 11, 1912.
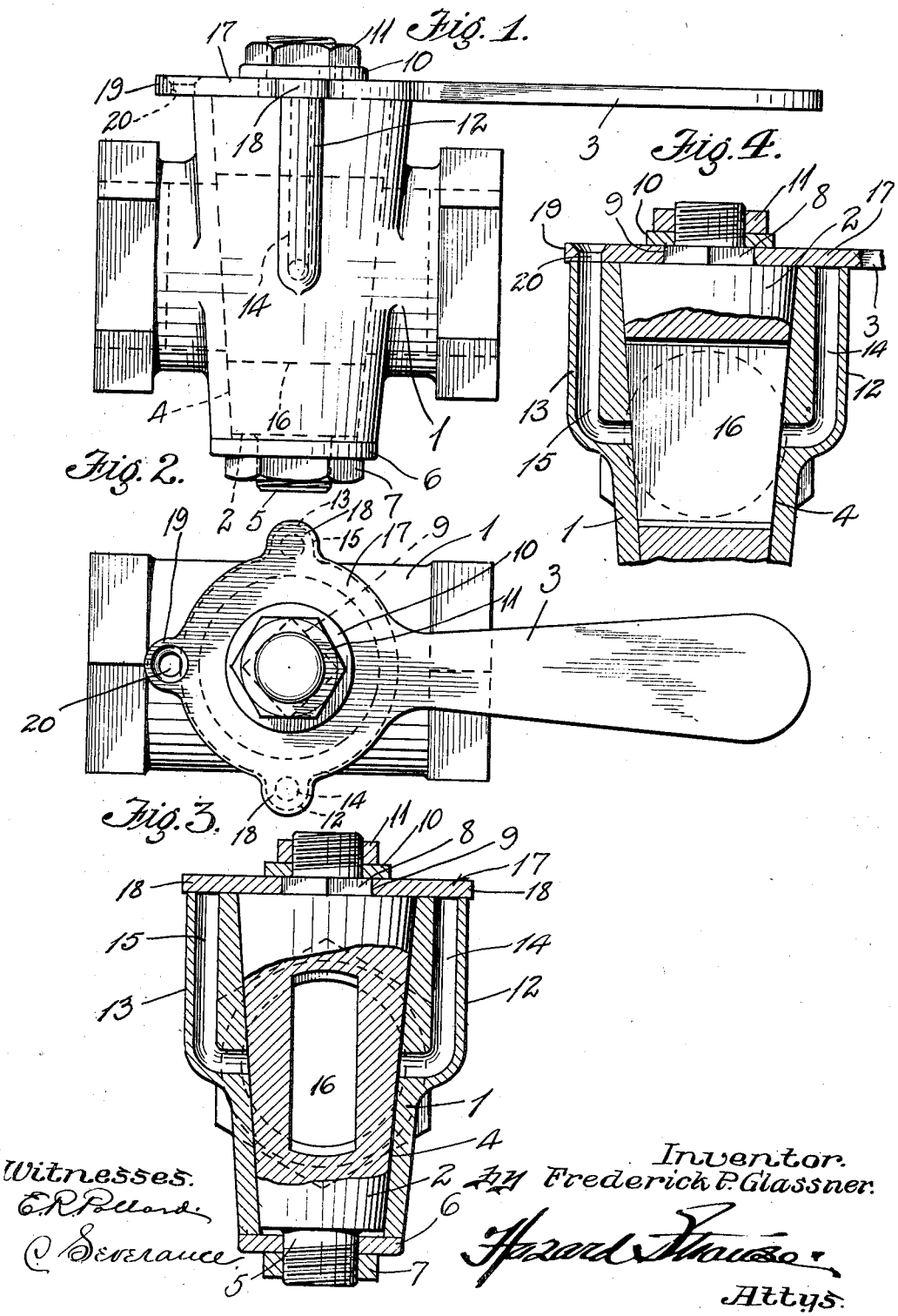
Witnesses
E. R. Pollard
C. Severance
Inventor
Frederick P. Glassner
Hazard Strauss
Attys.

UNITED STATES PATENT OFFICE.

FREDERICK P. GLASSNER, OF SEARCHLIGHT, NEVADA.

VALVE.

1,029,184.

Specification of Letters Patent. Patented June 11, 1912.

Application filed July 18, 1911. Serial No. 639,076.

*To all whom it may concern:*

Be it known that I, FREDERICK P. GLASSNER, a citizen of the United States, residing at Searchlight, in the county of Clark and State of Nevada, have invented new and useful Improvements in Valves, of which the following is a specification.

This invention relates to improvements in valve mechanisms and particularly to a valve structure which is adapted to receive and transmit to any other mechanism lubricating material.

It is an object of the invention to provide a valve mechanism through which the parts of machinery or mechanism operated by steam, air or other pressure, may receive lubricants or other materials which it is desired to pass to said mechanisms.

It is also an object of the invention to provide a valve with lubricating inlets which are normally closed when the valve is open and may be opened only by the closing of said valve whereby lubricants may be introduced into piping or mechanism when pressures of any kind are maintained.

In the accompanying drawing forming a part of this specification, Figure 1 is a side elevation of the improved valve mechanism forming the subject matter of this invention. Fig. 2 is a top plan view of the same. Fig. 3 is a transverse vertical sectional view through the valve mechanism, a portion of the valve being shown in elevation. Fig. 4 is a similar view showing the valve in its closed position and ready to receive a lubricant.

The details and features of the invention will now be more particularly described, reference being had to the said drawing in which—

1 indicates a valve casing, 2 a valve or plug mounted therein, and 3 indicates a handle for turning said valve or plug. The casing 1 may be of any desired type and is particularly adapted to be connected with piping or machinery, its opposite ends being open and adapted for such connection therewith.

The central portion of the casing 1 is formed with a conical valve seat or bore 4 in which the valve proper or plug 2 is made to fit. The lower end of the said valve or plug 2 is generally provided with a reduced extension 5 upon which a washer 6 and a nut 7 may be placed, for tightly holding the valve in position. The upper end of the said valve or plug projects a sufficient distance above the casing 1, to receive the handle 3, the said plug being formed with an angular or squared portion 8 adapted to fit in a correspondingly shaped opening 9, formed in the end of the handle 3. A washer 10 and a nut 11 is applied to a threaded extension formed upon the upper end of said valve or plug 2 for securely holding the handle in place. The said casing 1 is also provided with lateral projecting portions 12 and 13 in which are formed passages 14 and 15 adapted to receive lubricating material and direct it into the valve structure. The lower ends of the passages 14 and 15 turn inwardly and extend to the surface of the bore 4. The valve 2 is thus in position to close the said passages when it is turned to open communication through the casing 1.

The valve or plug 2 is provided with a port 16 of suitable size to establish a proper communication through the valve casing for steam, air or other materials which are to be controlled by the said valves. The said passages 14 and 15 are brought in communication with the port 16 when the valve is closed and the said port 16 is in position to extend transversely of the casing 1 as indicated in Fig. 4. When in this position lubricating materials may be directed through either one or both of the said passages 14 and 15 so as to run into the said port 16 and when the valve is opened again the lubricant may be taken up by the steam, air or other materials, and carried to the parts of the machinery which it is desired to lubricate.

The device is so constructed that the lubricating ports cannot be opened to receive the lubricant until the valve is brought to its closed position. For this reason the handle 3 is formed with an enlarged valve engaging head 17 which is adapted to project at the sides as at 18 so as to cover the upper ends of said passages 14 and 15 when the valve is in its open position. A similar projection 19 is also provided upon the said head 17 which is formed with an aperture 20 that may be brought over either one of the openings 14 or 15 when it is desired to introduce a lubricant into the valve. In order to bring the opening 20 over the said passages it is necessary to turn the handle 3 so that the valve is closed and there could therefore be no escape through said passages of the steam, air or other pressure that is controlled by the said valve mechanism. The device thus constitutes a safety valve mechanism through which parts of machinery may be readily lubricated at any time without the danger of permitting pressure to escape.

What I claim is:

1. A valve mechanism, comprising a casing, a valve plug fitting therein, the said casing having lateral passages formed in its walls having exteriorly arranged inlets and adapted to lead the lubricant directly into the port of the valve when it is in closed position for permitting of the filling of the port with a lubricant and means for turning the said valve.

2. A valve mechanism, comprising a casing, a turn plug fitting in said casing having a transverse port, the walls of the casing having passages formed therein to one side of the valve seat, said passages having their inner discharge ends opposite the port of the turn plug when the valve is closed, and means for closing the exterior entrance to said passages when the valve is open.

3. A lubricating valve mechanism, comprising a casing having a valve seat therein, and provided with lateral projections having lubricating passages extending through the same, and a handle for turning the valves, having covering portions adapted to close the said lubricating ports.

4. A lubricating valve comprising a casing, a valve fitting therein, the said casing having a lubricant inlet formed in its walls and adapted to lead lubricants into the port of the valve, a handle for turning the valve, and means carried thereby for closing the lubricant passage when the valve is in opened position, the said closing means also having an opening adapted to be brought over the lubricant passage for admitting lubricant thereto.

In witness that I claim the foregoing I have hereunto subscribed my name this 12th day of July, 1911.

F. P. GLASSNER.

Witnesses:
J. F. BOOTH,
A. W. BLIESENER.